United States Patent Office 2,857,305
Patented Oct. 21, 1958

2,857,305

PHOSPHONATE ESTERS

Gail H. Birum, Dayton, Ohio, assignor to Monsanto Chemical Company, St. Louis, Mo., a corporation of Delaware No Drawing. Application December 30, 1955
Serial No. 556,438

19 Claims. (Cl. 167—22)

This invention relates to novel miticidal disulfides, to a process of preparing the same, and to methods and compositions for the application of the present novel compounds.

The compounds provided by this invention are derived by condensation of a sulfenyl halide with a mercapto-substituted hydrocarbonphosphonate lower alkyl or haloalkyl ester, as illustrated by the following equation:

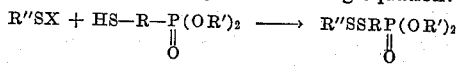

where X is halogen, R' is a lower alkyl or haloalkyl radical, R is a hydrocarbon radical, as further defined hereinbelow, and R" is the residue of the aforesaid sulfenyl halide. Particularly preferred in the present process are sulfenyl halides of the formula R"SX where X is chlorine or bromine, and R" is a hydrocarbon radical containing from one to ten carbon atoms, free of non-benzenoid unsaturation, containing no substituents other than halogen atoms and nitro radicals. By non-benzenoid unsaturation is here meant carbon-to-carbon, olefinic or acetylenic unsaturation.

Aryl sulfenyl halides useful in the present process include, e. g., the benzenesulfenyl halides, e. g., benzenesulfenyl chloride, bromide, or iodide; alkyl-substituted benzenesulfenyl halides, e. g., p-toluenesulfenyl chloride, 2,4-diethylbenzenesulfenyl bromide, o-n-butylbenzenesulfenyl chloride, p-t-butylbenzene sulfenyl chloride, etc.; halogen-substituted benzenesulfenyl halides, e. g., o-, m-, or p-chlorobenzene sulfenyl chloride, 2,3-, 3,4-, or 2,4-dibromobenzene sulfenyl chloride, 2,4,6-trichlorobenzenesulfenyl chloride, pentachlorobenzene sulfenyl chloride, 2-chloro-3-bromobenzenesulfenyl chloride, p-fluorobenzenesulfenyl chloride, etc.; and nitro-substituted benzenesulfenyl halides such as p-nitro-benzenesulfenyl chloride or 2,4-dinitrobenzenesulfenyl bromide, etc. There may also be used benzenesulfenyl halides such as 4-chloro-2-nitrobenzene sulfenyl chloride, 2-chloro-4-nitrobenzenesulfenyl chloride, or 2-chloro-5-methylbenzenesulfenyl chloride; i. e., benzenesulfenyl halides having a diversity of substituents in the benzene ring. As examples of alkyl and cycloalkyl sulfenyl halides of the presently preferred formula may be listed 1-butanesulfenyl bromide, chloromethanesulfenyl chloride, trichloromethanesulfenyl chloride, 2-chloroethanesulfenyl chloride, 2-nitropropanesulfenyl chloride, 5-chloropentanesulfenyl chloride, 2-chlorocyclohexanesulfenyl chloride, etc. Especially preferred in the present process are the chloro- and/or nitro-substituted sulfenyl halides.

Mercapto-substituted phosphonate esters which may be reacted with the above sulfenyl halides in accordance with the present process to produce the novel compound of this invention include lower alkyl and chloroalkyl esters of mercapto-substituted hydrocarbonphosphonic acids. Mercapto-substituted phosphonate esters may be prepared, e. g., as described in my copending application, Serial No. 556,436, of even date and common assignment herewith, by the reaction of a ketophosphonic acid ester with hydrogen sulfide and hydrogen in the presence of a hydrogenation catalyst resistant to sulfur poisoning. Preferred in the present process are mercaptophosphonates of the formula

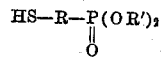

where R' is a lower alkyl or haloalkyl radical, and R is a hydrocarbon radical containing from one to ten carbon atoms and free of non-benzenoid unsaturation, linking the phosphorus and sulfur atoms by a chain of from one to five aliphatic carbon atoms.

As examples of mercaptoalkylphosphonate esters which may be used in the present process may be listed, e. g., dialkyl and bis(haloalkyl) esters of β-, γ-, etc., -mercaptoalkylphosphonic acids, such as dimethyl 2-mercaptoethylphosphonate, diethyl 2-mercaptoethylphosphonate, bis(2-chloroethyl) 2-mercaptoethylphosphonate, dibutyl 2-mercaptoethylphosphonate, diamyl 2-mercaptoethylphosphonate, ethyl methyl 3-mercaptopropylphosphonate, diisopropyl 3-mercaptopropylphosphonate, bis(2-chloroethyl) 3-mercaptopropylphosphonate, diethyl 1-mercapto-2-propylphosphonate, dimethyl 2-mercapto-2-methylpropylphosphonate, diamyl 2-mercapto-2-methylpropylphosphonate, bis(2,2-dichloropropyl) 3-mercaptobutylphosphonate, di-t-butyl 2-(mercaptomethyl)-butylphosphonate, ethyl isoamyl 4-mercaptobutylphosphonate, diethyl 5-mercaptopentylphosphonate, diethyl 2-mercapto-2,4,4-trimethylpentylphosphonate, diethyl 2-mercapto-2-ethylhexylphosphonate, diethyl 4-mercaptodecylphosphonate, etc. Examples of presently useful phosphonate esters wherein the mercapto group is at least one carbon atom removed from the phosphinyl radical and wherein a cyclic hydrocarbon radical is attached to the hydrocarbon radical linked to the phosphorus atom are: diethyl 2-mercapto-1-phenylethylphosphonate, dimethyl 2-mercapto-2-phenylethylphosphonate, di-n-propyl 2-mercapto-2-phenylethylphosphonate, bis(2-chloroethyl) 2-mercapto-2-phenylethylphosphonate, 2-chloroethyl ethyl 2-mercapto-3-phenylpropylphosphonate, diamyl 2-mercapto-2-phenylpropylphosphonate, diethyl 2-mercapto-2-(2,4-xylyl)ethylphosphonate, diisobutyl 2-mercapto-2-(2,5-xylyl)ethylphosphonate, diethyl 2-mercapto-2-(p-ethylphenyl)ethylphosphonate, bis(2-chloroethyl) 2-cyclohexyl-2-mercaptoethylphosphonate, diisopropyl 3-mercapto-3-phenylpropylphosphonate, bis(2-chloropropyl) 2-mercapto-4-phenylbutylphosphonate, etc.

Particularly preferred in the present process are mercaptophosphonate esters, wherein the mercapto group is alpha to the phosphorus atom, such as 1-mercaptoalkylphosphonate esters, e. g., dimethyl mercaptomethylphosphonate, diethyl mercaptomethylphosphonate, diisopropyl mercaptomethylphosphonate, diethyl 1-mercaptoethylphosphenate, bis(2-chloroethyl) 1-mercaptoethylphosphonate, diisobutyl 1-mercaptoethylphosphonate, ethyl isoamyl 1-mercaptopropylphosphonate, dipropyl 1-mercaptopropylphosphonate, dibutyl 1-mercaptopropylphosphonate, dimethyl 1-mercapto-2,2-dimethylpropylphosphonate, etc. Other examples of presently useful α-mercaptophosphonate esters are α-mercaptoaralkylphosphonates, such as diethyl α-mercaptobenzylphosphonate, diisobutyl α-mercaptobenzylphosphonate, ethyl methyl α-mercaptobenzylphosphonate, diamyl α-mercaptobenzylphosphonate, bis-(2-chloroethyl) α-mercaptobenzylphosphonate, diethyl α-mercapto-p-methylbenzylphosphonate, diethyl α-mercapto-p-n-propylbenzylphosphonate, di-n-propyl α-mercapto-2,4-dimethylbenzylphosphonate, di-t-butyl α-mercapto-p-ethylbenzylphosphonate, diethyl α-mercaptocuminylphosphonate, dimethyl α-mercaptocuminylphosphonate, diethyl (cyclohexyl)(mercapto)methylphosphonate, etc.

The products of the present reaction are (organodithio)-hydrocarbonphosphonates of the formula

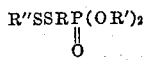

where R″ is a hydrocarbon radical containing from one to ten carbon atoms, free of non-benzenoid substituents, and free of substituents other than halogen atoms and nitro radicals, R is a hydrocarbon radical containing from one to ten carbon atoms and free of non-benzenoid unsaturation, linking the phosphorus and sulfur atoms by a chain of from one to five aliphatic carbon atoms, and R′ is a lower alkyl or haloalkyl radical.

As examples of the present products may be listed, e. g., the products of the reaction of benzene- and alkyl-substituted benzenesulfenyl halides and β-, γ-, etc., -mercaptoalkylphosphonates, such as diethyl 2-(phenyldithio)-ethylphosphonate, diamyl 2-(phenyldithio)ethylphosphonate, ethyl methyl 2-(p-tolyldithio)ethylphosphonate, diisopropyl 2-(p-tolyldithio)ethylphosphonate, diethyl 2-(2,4-diethylphenyldithio)ethylphosphonate, bis(2-chloroethyl) 2-(o-n-butylphenyldithio)ethylphosphonate, diethyl 2-(phenyldithio)-propylphosphonate, diethyl 3-(phenyldithio)propylphosphonate, dibutyl 2 - (p - tolyldithio) - 2 - methylpropylphosphonate, diethyl 2 - (phenyldithio-methyl)butylphosphonate, diethyl 2 - (2,4 - xylyldithio)-2,4,4-trimethylpentylphosphonate, etc. Reaction products of benzene and alkylbenzenesulfenyl halides with β-, γ-, etc., -mercaptoaralkyl- and -mercapto(cycloalkyl)alkylphosphonates are, e. g., diethyl 1-phenyl-2-(phenyldithio)ethylphosphonate, bis(2 - chloroethyl) 2 - phenyl - 2-(phenyldithio)ethylphosphonate, dibutyl 2 - phenyl - 2-(phenyldithio)propylphosphonate, isopropyl n-propyl 2-(phenyldithio) - 2 - (p - ethylphenyl)ethylphosphonate, diethyl 2-cyclohexyl-2-(p-tolyldithio)ethylphosphonate, diisopropyl 3-phenyl-2-(phenyldithio)propylphosphonate, etc. As exemplary of the present novel products of reaction of benzene- and alkylbenzenesulfenyl halides and α-mercaptophosphonates may be listed, e. g., diethyl (phenyldithio)methylphosphonate, dimethyl (phenyldithio)methylphosphonate, dipropyl (cumyldithio)methylphosphonate, diethyl 1-(phenyldithio)-ethylphosphonate, dibutyl 1 - (phenyldithio)ethylphosphonate, diethyl α-(phenyldithio)benzylphosphonate, di-t-butyl α-(p-tolyldithio)-p-methylbenzylphosphonate, etc.

Another class of presently-afforded phosphonate derivatives are the reaction products of chloro- and/or nitro-substituted arylsulfenyl halides and mercaptophosphonate esters. As examples of the present novel products prepared from β-, γ-, etc., -mercaptophosphonates may be listed, e. g., diethyl 2-(p-chlorophenyldithio)-ethylphosphonate, bis(2-chloroethyl) 2-(p-chlorophenyldithio)ethylphosphonate, bis(2-bromoethyl) 2-(p-chlorophenyldithio)ethylphosphonate, diethyl 3 - (p - chlorophenyldithio)propylphosphonate, dipropyl 2 - (p - chlorophenyldithio) - 2 - methylpropylphosphonate, diethyl 2-(pentachlorophenyldithio)ethylphosphonate, bis(4-chlorobutyl) 2-(2,4-dichlorophenyldithio)ethylphosphonate, diethyl 2-(2-chloro-3-bromophenyldithio)ethylphosphonate, diethyl 2 - (p - fluorophenyldithio)ethylphosphonate, diethyl 2-(2,4,6-trichlorophenyldithio)ethylphosphonate, diethyl 3-(p-chlorophenyldithio)butylphosphonate, diethyl 2-(o-nitrophenyldithio)ethylphosphonate, diethyl 3-(2-nitro-5-methylphenyldithio)phosphonate, di-n-butyl 2-(2-nitro - 5 - methylphenyldithio) - 2 - methylpropylphosphonate, diethyl 2 - (p - nitrophenyldithio)ethylphosphonate, diisobutyl 2-(2,4-dinitrophenyldithio)propylphosphonates, etc. Members of the present novel class of phosphonates produced by reaction of β-, γ-, etc., -mercaptoaralkylphosphonates with a chloro- and/or nitro-substituted benzenesulfenyl halides are, e. g., diethyl 2-(2,4-xylyl)-2-(p-chlorophenyldithio)ethylphosphonate, ethyl methyl 2 - phenyl - 2 - (p - chlorophenyldithio)ethylphosphonate, diisopropyl 2-p-tolyl-2-(3,4-dibromophenyldithio)propylphosphonate, diamyl 2-cyclohexyl-2-(p-chlorophenyldithio)ethylphosphonate, di-n-propyl 3-(2,4-dichlorophenyldithio)-4-phenylbutylphosphonate, diethyl 2-phenyl-2-(p-nitrophenyldithio)ethylphosphonate, diethyl 2 - cyclopentyl - 2 - (4 - chloro - 2 - nitrophenyldithio)ethylphosphonate, diethyl 3 - (2 - chloro - 4 - nitrophenyldithio)-3-phenylpropylphosphonate, etc.

Products of the reaction of α-mercaptophosphonates with chloro and/or nitro-substituted arylsulfenyl halides are, e. g., (aryldithio)alkylphosphonates such as dimethyl p-chlorophenyldithiomethylphosphonate, diethyl p-chlorophenyldithiomethylphosphonate, diisopropyl p - chlorophenyldithiomethylphosphonate, diethyl (2,4 - dichlorophenyldithio)methylphosphonate, diethyl [3-chloro-4-(2-chloroethyl)phenyldithio]methylphosphonate, diisobutyl (2 - methyl - 5 - nitrophenyldithio)methylphosphonate, diethyl (2-chloro-4-nitrophenyldithio)methylphosphonate, diethyl 1-(p-chlorophenyldithio)ethylphosphonate, bis(2-bromoethyl) 1-(p-bromophenyldithio)ethylphosphonate, di - n - propyl 1 - (pentachlorophenyldithio)ethylphosphonate, diethyl 1-(2,4-dichlorophenyldithio)ethylphosphonate, diethyl 1 - (2 - methyl - 4 - chlorophenyldithio)ethylphosphonate, dibutyl 1 - (o - nitrophenyldithio)ethylphosphonate, diisopropyl 1-(2-methyl-5-nitrophenyldithio)-ethylphosphonate, methyl isopropyl 1-(p-chlorophenyldithio)propylphosphonate, diethyl 1-(2,4-dichlorophenyldithio)propylphosphonate, diethyl 1 - (o - nitrophenyldithio)propylphosphonate, dibutyl 1 - (4 - chloro - 2 - nitrophenyldithio)butylphosphonate, diethyl 1 - (2 - chloro - 3-bromophenyldithio)hexylphosphonate, diamyl 1 - (4-chloro-2-nitrophenyldithio)decylphosphonate, dimethyl 1-(p - chlorophenyldithio) - 2,2 - dimethylpropylphosphonate, etc. Novel α-(aryldithio)aralkylphosphonates which may be produced similarly by the present process are, e. g., diethyl α-(p-chlorophenyldithio)-benzylphosphonate, diethyl α-(2,4-dichlorophenyldithio)benzylphosphonate, di-t-butyl α-(2-methyl-4-chlorophenyldithio)benzylphosphonate, diethyl α-(p-chlorophenyldithio)-p-methylbenzylphosphonate, diethyl α - (o - nitrophenyldithio) - p-ethylbenzylphosphonate, diethyl α-(o-nitrophenyldithio)-cuminylphosphonate, diethyl 1 - (2,4 - dichlorophenyldithio) - 2 - (2,4 - xylyl)ethylphosphonate, di - t - butyl 1-(2 - chloro - 4 - methylphenyldithio) - 3 - p - tolylpropylphosphonate, dimethyl 1-(2-chloro-4-nitrophenyldithio)-2-phenylethylphosphonate, etc.

Examples of products of reaction of β-, γ-, etc., -mercapto-substituted phosphonates and alkyl or cycloalkyl sulfenyl halides, substituted and unsubstituted, are, e. g., products of the reaction of mercaptoalkylphosphonate esters such as diethyl 2-(butyldithio)-ethylphosphonate, bis(2-chloroethyl) 2-(amyldithio)ethylphosphonate, diisopropyl 2-(dichloromethyldithio)ethylphosphonate, diethyl 2-(trichloromethyldithio)ethylphosphonate, diethyl 2-(2-chloroethyldithio)ethylphosphonate, dimethyl 2-(2-nitropropyldithio)ethylphosphonate, di - n - butyl 2-(2-chlorocyclohexyldithio) - 2,4,4 - trimethylpentylphosphonate, etc.; and products of reaction of mercaptoaralkyl- and -(cycloalkyl)alkylphosphonates, such as diethyl 2-(trichloromethyldithio) - 2 - phenylethylphosphonate, dimethyl 3 - (2 - nitropropyldithio) - 4 - phenylbutylphosphonate, dibutyl 2-(butyldithio)-2-p-tolylethylphosphonate, diethyl 2-cyclohexyl-2-(1-chloroethyldithio)ethylphosphonate, etc. Reaction of alkyl and cycloalkyl sulfenyl halides in accordance with the invention with α-mercaptophosphonate esters gives, e. g., diethyl 1-(amyldithio)ethylphosphonate, dimethyl 1-(dichloromethyldithio)ethylphosphonate, diamyl 1-(trichloromethyldithio)-ethylphosphonate, diethyl 1 - (2 - nitropropyldithio)ethylphosphonate, diisobutyl (butyldithio)methylphosphonate, diethyl α-(trichloromethyldithio)benzylphosphonate, diethyl α-(3-nitrobutyldithio)benzylphosphonate, diisopropyl α - (propyldithio)benzylphosphonate, diethyl α - (2-chlorocyclohexyldithio)cuminylphosphonate, etc.

The present (organodithio)hydrocarbonphosphonate esters are stable, generally liquid materials which may be used for a wide variety of industrial and agricultural purposes, e. g., as antistatic agents, as oil and gasoline additives, as rubber chemicals, etc. They are particularly useful as biological toxicants, e. g., as rodent-repellents, soil fumigants, bactericides, and especially insecticides and miticides. The present compounds possess pronounced miticidal activity, and may be applied, for example, to plants, to protect them against infestation by spiders and other members of the Arachnid family.

In carrying out the present reaction, the sulfenyl halide is simply contacted with the mercaptophosphonate ester at ordinary, increased or decreased temperatures, until formation of the disulfide product has occurred. Depending upon the individual reactants employed, as well as on the quantities used, heating or cooling of the reactant mixture may be required. In many cases, formation of the products takes place spontaneously, although the reaction may, if desired, be expedited by heating the reaction mixture at, e. g., up to the reflux temperature of the reaction mixture. It is also often advantageous to work in the presence of an inert diluent or solvent, which assists in moderating the reaction temperature and in dissipating the heat of reaction. Useful inert solvents and diluents are, e. g., benzene, toluene, hexane, ether, etc. An excess of either reactant and gradual introduction of the other may also result in smoother operation. Hydrogen chloride, as will be evident from the equation given above, is evolved during the reaction, and is preferably removed from the reaction mixture as formed, e. g., by addition of a hydrogen chloride scavenger. Useful HCl scavengers are bases, e. g., inorganic bases such as sodium hydroxide, sodium carbonate, sodium bicarbonate, etc., and organic bases such as pyridine, quinoline, etc. The present condensation reaction may also be effected at increased or decreased pressure, or in the presence of a catalyst; however, the ease of reaction at ordinary atmospheric pressure and in the absence of catalysts generally requires no control of the reaction by pressure variation or acceleration thereof by catalytic means.

The invention is further illustrated, but not limited, by the following examples:

*Example 1*

A 500 ml. four-necked flask, equipped with stirrer, thermometer, condenser, and dropping funnel, and containing 150 ml. of benzene and 17.6 g. (0.166 mole) of sodium carbonate, was cooled in ice. To the cooled contents of the flask were added 16.5 g. (0.083 mole) of diethyl 1-mercaptoethylphosphonate; then, p-chlorobenzenesulfenyl chloride was dropped into the flask slowly, while the temperature of the mixture was held at 2–6° C., until the sulfenyl halide was no longer decolorized. This required 20 minutes; 14.8 grams (0.083 mole) of p-chlorobenzenesulfenyl chloride were used. The mixture was then stirred and warmed to room temperature, filtered, and concentrated to a pot temperature of 76° C./0.3 mm., to give 28.0 g. (99% theor. yield) of yellow, liquid, diethyl 1-(p-chloropenyldithio)ethylphosphonate, $n_D^{25}$ 1.5547, analyzing as follows:

|  | Found | Calcd. for $C_{12}H_{18}ClO_3PS_2$ |
|---|---|---|
| Percent Cl | 10.77 | 10.4 |
| Percent S | 19.01 | 18.8 |
| Percent P | 8.83 | 9.1 |

*Example 2*

Operating as described in Example 1, a solution of 14.2 g. of o-nitrobenzenesulfenyl chloride in benzene was reacted with 23.7 g. of dibutyl α-mercaptobenzylphosphonate, addition of the sulfenyl chloride being followed by heating to 50–62° C. for one hour. The reaction mixture was then concentrated to a pot temperature of 88° C./0.1 mm., to give dibutyl α-(o-nitrophenyldithio)benzylphosphonate, a brown liquid, analyzing as follows:

|  | Found | Calcd. for $C_{21}H_{28}NO_5PS_2$ |
|---|---|---|
| Percent C | 53.21 | 53.7 |
| Percent H | 6.60 | 6.02 |
| Percent S | 12.46 | 13.6 |

A few grams of a yellow solid, presumably bis(o-nitrophenyl)disulfide, separated from the phosphonate on standing and were removed from the phosphonate by filtration before analysis.

*Example 3*

To a mixture of 150 ml. of benzene and 15.8 g. of dibutyl α-mercaptobenzylphosphonate were added 11.2 g. of trichloromethanesulfenyl chloride. The heat of reaction raised the temperature of the mixture from 28° to 32° C.; the reaction mixture was then warmed to 52–63° C. for about an hour, until evolution of hydrogen chloride had essentially ceased. Concentration to a pot temperature of 104° C./0.2 mm. gave 19.9 g. of yellow liquid, dibutyl α-(trichloromethyldithio)benzylphosphonate containing 6.39% P and 12.1% S ($C_{16}H_{24}Cl_3O_3PS_2$ requires 6.7% P, 13.7% S).

*Example 4*

A mixture of 50 ml. of benzene and 9.5 g. of dibutyl α-mercaptobenzylphosphonate was held at 23–28° C. while 9.5 g. of pentachlorobenzenesulfenyl halide was added over a period of 20 minutes. An additional 0.7 g. of dibutyl α-mercaptobenzylphosphonate was then added to the mixture, producing decolorization, after which the reaction mixture was concentrated to a pot temperature of 95° C./0.2 mm. to give 18.6 g. of yellow liquid dibutyl α-(pentachlorophenyldithio)benzylphosphonate, $n_D^{25}$ 1.5817, analyzing as follows:

|  | Found | Calcd. for $C_{21}H_{24}Cl_5O_3PS_2$ |
|---|---|---|
| Percent P | 5.23 | 5.2 |
| Percent S | 10.17 | 10.7 |
| Percent Cl | 28.26 | 29.8 |

*Example 5*

By a procedure as described above, bis(2-chloroethyl) 2-mercaptoethylphosphonate is reacted with 2-nitro-5-methylbenzenesulfenyl chloride to give bis(2-chloroethyl) 2-(2-nitro-5-methylphenyldithio)ethylphosphonate, containing 16.3% Cl, 14.8% S, and 7.1% P.

*Example 6*

This example illustrates the miticidal activity of the present compounds.

An emulsion of the product of Example 1 was prepared by dissolving the diethyl 1-(p-chlorophenyldithio)ethylphosphonate in cyclohexanone, adding a small quantity of "Emulsifier L," a commercial emulsifier described as a polyalkylene glycol ether-long-chain alkylbenzene sulfonate, and diluting with water to give an 0.2% concentration of the phosphonate. A potted bean plant which had been previously infested with two-spotted spider mites was dipped in this emulsion, drained, and then held in the greenhouse under standard conditions of moisture and temperature for 7–10 days. It was found that this treatment killed substantially all of adult mites on the plant. Similarly, an 0.1% aqueous emulsion of diethyl 1-(p-chlorophenyldithio)ethylphosphonate and "Emulsifier L" was prepared and applied to a lima bean leaf infested with spider mites. At the end of 48 hours, 97% of the adult mites were dead. Seven days later the leaf was again inspected and it was found that a 50% mortality of the mite resting stages had been produced.

In other tests, the compound of Example 1 was found to exert fungistatic action on *Aspergillus niger* at a concentration of 0.1%.

Other sulfenyl halide-mercaptohydrocarbonphosphonate ester condensates which may be used as insecticides include the reaction product of 2-nitro-5-methylbenzenesulfenyl chloride and bis(2-chloroethyl) 2-mercaptoethylphosphonate, i. e., bis(2-chloroethyl) 2-(2-nitro-5-methylphenyldithio)ethylphosphonate; the reaction product of 2-chloro-4-nitrobenzenesulfenyl chloride and dibutyl 2-mercapto-2-phenylethylphosphonate, i. e., dibutyl 2-(2-chloro-4-nitrophenyldithio)-2-phenylethylphosphonate, etc.

The present (organodithio)hydrocarbonphosphonate esters are generally applied for insecticidal use in the form of sprays or aerosols. Useful sprays may be prepared by dispersing the present products in water with the aid of a wetting agent, to prepare aqueous dispersions which may be employed as sprays; in other procedures, the products may be applied to mite and insect hosts as oil-in-water emulsion sprays. The present (organodithio)hydrocarbonphosphonate esters may also be dissolved in liquified gases, such as fluorochloroethanes or methyl chloride, and applied to plants, etc., from aerosol bombs. Instead of employing liquids as carriers and diluents, insecticidal dusts which contain the present (organodithio)hydrocarbonphosphonate esters as active ingredients may be prepared, e. g., by incorporating the active phosphonate with a solid carrier such as talc, bentonite, fuller's earth, etc.

It is apparent that this invention may be extended to uses beyond those specifically described and that many widely-differing embodiments can be made without departing from the spirit and scope thereof. Therefore, it is not intended to be limited, except as indicated in the appended claims.

What is claimed is:

1. Phosphonate esters of the formula

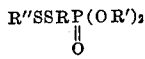

where R″ is a hydrocarbon radical containing from one to ten carbon atoms and free of non-benzenoid unsaturation, containing no substituents other than substituents selected from the class consisting of halogen atoms and the nitro radical, R′ is a radical selected from the class consisting of lower alkyl radicals and halo-lower-alkyl radicals, and R is a hydrocarbon radical containing from one to ten carbon atoms and free of non-benzenoid unsaturation, linking the phosphorus and sulfur atoms by a chain of from one to five aliphatic carbon atoms.

2. Lower alkyl phosphonate esters of the formula

where R′ is a lower alkyl radical, R is a hydrocarbon radical containing from one to ten carbon atoms and free of non-benzenoid unsaturation, linking the phosphorus and sulfur atoms by a chain of from one to five aliphatic carbon atoms, and R″ is a hydrocarbon radical containing from one to ten carbon atoms, free of non-benzenoid unsaturation, which contains at least one halogen substituent.

3. Lower alkyl organodithiomethylidenephosphonate esters of the formula

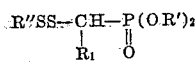

where R′ is a lower alkyl radical, R₁ is a hydrocarbon substituent containing from one to nine carbon atoms and free of non-benzenoid unsaturation, and R″ is a hydrocarbon radical containing from one to ten carbon atoms, free of non-benzenoid unsaturation, which contains at least one halogen substituent.

4. Diethyl 1-(p-chlorophenyldithio)ethylphosphonate.

5. Dibutyl α-(o-nitrophenyldithio)benzylphosphonate.

6. Dibutyl α-(trichloromethyldithio)benzylphosphonate.

7. Dibutyl α-(pentachlorophenyldithio)benzylphosphonate.

8. Bis(2-chloroethyl) 2-(2-nitro-5-methylphenyldithio)ethylphosphonate.

9. The process which comprises contacting a sulfenyl halide of the formula R″SX, where R″ is a hydrocarbon radical containing from one to ten carbon atoms and free of non-benzenoid unsaturation, containing no substituents other than substituents selected from the class consisting of halogen atoms and the nitro radical, and X is a halogen selected from the class consisting of chlorine and bromine, with a mercaptophosphonate of the formula

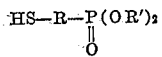

where R′ is selected from the class consisting of lower alkyl and halo-lower-alkyl radicals, and R is a hydrocarbon radical containing from one to ten carbon atoms and free of non-benzenoid unsaturation, linking the phosphorus and sulfur atoms by a chain of from one to five aliphatic carbon atoms, and isolating from the resulting reaction product a phosphonate ester of the formula

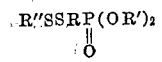

where R″, R′ and R are as defined hereinabove.

10. The process which comprises contacting a sulfenyl halide of the formula R″SX where R″ is a hydrocarbon radical containing from one to ten carbon atoms, free of non-benzenoid unsaturation, which contains at least one halogen substituent, and X is chlorine, with a dialkyl mercaptophosphonate of the formula

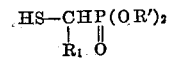

where R₁ is a hydrocarbon radical containing from one to nine carbon atoms and free of non-benzenoid unsaturation, and R′ is a lower alkyl radical, and isolating from the resulting reaction product a phosphonate ester of the formula

where R″, R″ and R₁ are as defined hereinabove.

11. The process which comprises contacting p-chlorobenzenesulfenyl chloride with diethyl 1-mercaptoethylphosphonate and isolating from the resulting reaction product diethyl 1-(p-chlorophenyldithio)ethylphosphonate.

12. The method which comprises contacting o-nitrobenzenesulfenyl chloride with dibutyl α-mercaptobenzylphosphonate and isolating from the resulting reaction product dibutyl α-(o-nitrophenyldithio)benzylphosphonate.

13. The process which comprises contacting trichloromethanesulfenyl chloride with dibutyl α-mercaptobenzylphosphonate and isolating from the resulting reaction product dibutyl α-(trichloromethyldithio)benzylphosphonate.

14. The process which comprises contacting pentachlorobenzenesulfenyl chloride with dibutyl α-mercaptobenzylphosphonate and isolating from the resulting reaction product dibutyl α-(pentachlorophenyldithio)benzylphosphonate.

15. The method which comprises contacting 2-nitro-5-methylbenzenesulfenyl chloride with bis(2-chloroethyl) 2-mercaptoethylphosphonate and isolating from the resulting reaction product bis(2-chloroethyl) 2-(2-nitro-5-methylphenyldithio)ethylphosphonate.

16. A miticidal compostion comprising an inert carrier and a toxic quantity of a phosphonate ester of the formula

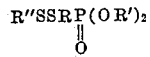

where R″ is a hydrocarbon radical containing from one to ten carbon atoms and free of non-benzenoid unsaturation, containing no substituents other than substituents selected from the class consisting of halogen atoms and the nitro radical, R' is a radical selected from the class consisting of lower alkyl radicals and halo-lower-alkyl radicals, and R is a hydrocarbon radical containing from one to ten carbon atoms and free of non-benzenoid unsaturation, linking the phosphorus and sulfur atoms by a chain of from one to five aliphatic carbon atoms.

17. A miticidal composition comprising an inert carrier and a toxic quantity of diethyl 1-(p-chlorophenyl-dithio)ethylphosphonate.

18. The method of killing mites which comprises exposing said mites to a toxic quantity of phosphonate esters of the formula

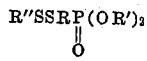

where R" is a hydrocarbon radical containing from one to ten carbon atoms and free of non-benzenoid unsaturation, containing no substituents other than substituents selected from the class consisting of halogen atoms and the nitro radical, R' is a radical selected from the class consisting of lower alkyl radicals and halo-lower-alkyl radicals, and R is a hydrocarbon radical containing from one to ten carbon atoms and free of non-benzenoid unsaturation, linking the phosphorus and sulfur atoms by a chain of from one to five aliphatic carbon atoms.

19. The method of killing mites which comprises exposing said mites to a toxic quantity of diethyl 1-(p-chlorophenyldithio)ethylphosphonate.

References Cited in the file of this patent

UNITED STATES PATENTS

| | | |
|---|---|---|
| 2,596,076 | Hook et al. | May 6, 1952 |
| 2,668,828 | Tolkmith | Feb. 9, 1954 |
| 2,724,718 | Stiles et al. | Nov. 22, 1955 |